(12) United States Patent
Asakimori

(10) Patent No.: US 11,165,925 B2
(45) Date of Patent: Nov. 2, 2021

(54) API FOR PRINTING APPARATUS FUNCTIONS

(71) Applicant: Hiroki Asakimori, Tokyo (JP)

(72) Inventor: Hiroki Asakimori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 16/693,614

(22) Filed: Nov. 25, 2019

(65) Prior Publication Data

US 2020/0177758 A1 Jun. 4, 2020

(30) Foreign Application Priority Data

Nov. 29, 2018 (JP) .............................. JP2018-224198
Jun. 27, 2019 (JP) .............................. JP2019-120424

(51) Int. Cl.
 G06F 3/12 (2006.01)
 H04N 1/00 (2006.01)
 G06F 9/54 (2006.01)

(52) U.S. Cl.
 CPC ......... H04N 1/00941 (2013.01); G06F 9/543 (2013.01); H04N 1/00411 (2013.01); H04N 1/00477 (2013.01); H04N 1/00503 (2013.01)

(58) Field of Classification Search
 None
 See application file for complete search history.

(56) References Cited

U.S. PATENT DOCUMENTS

| | | | |
|---|---|---|---|
| 9,442,641 B2 | 9/2016 | Asakimori | |
| 9,454,386 B2 | 9/2016 | Kawai | |
| 9,794,447 B2 | 10/2017 | Fukasawa et al. | |
| 10,165,132 B2 | 12/2018 | Asakimori | |
| 10,270,941 B2 | 4/2019 | Asakimori | |
| 2007/0019226 A1* | 1/2007 | Matsuura .............. | G06F 3/1259 358/1.14 |
| 2009/0089076 A1 | 4/2009 | Asakimori et al. | |
| 2012/0099146 A1* | 4/2012 | Stokes ............... | H04N 1/32432 358/1.15 |
| 2017/0111531 A1 | 4/2017 | Mitsuke et al. | |
| 2017/0249113 A1* | 8/2017 | Sato ...................... | G06F 3/1239 |
| 2018/0068345 A1 | 3/2018 | Hirokawa et al. | |
| 2018/0074762 A1* | 3/2018 | Ozeki .................. | G06F 3/1205 |
| 2018/0267753 A1 | 9/2018 | Asakimori et al. | |

FOREIGN PATENT DOCUMENTS

| | | |
|---|---|---|
| JP | 2014-150320 | 8/2014 |
| JP | 2017-085490 | 5/2017 |
| JP | 2018-046551 | 3/2018 |
| JP | 2019-024187 | 2/2019 |

* cited by examiner

*Primary Examiner* — Eric A. Rust

(74) *Attorney, Agent, or Firm* — IPUSA, PLLC

(57) ABSTRACT

An information processing apparatus includes first processing circuitry; and a first memory storing computer-executable instructions that cause the first processing circuitry to: accept, by an application, an instruction to cause an image forming apparatus to execute image processing; give, by a print framework, an instruction to execute the image processing to the image forming apparatus; and cause, by a first function providing application, the print framework to give the instruction to execute the image processing to the image forming apparatus, upon receiving a call from the application.

8 Claims, 14 Drawing Sheets

FIG.13

SELECTION OF PRINT FRAMEWORK

○ PRINT FRAMEWORK 1

○ PRINT FRAMEWORK 2

SELECT

API FOR PRINTING APPARATUS FUNCTIONS

CROSS-REFERENCE TO RELATED APPLICATION

The present application is based on and claims priority under 35 U.S.C. § 119 to Japanese Patent Application No. 2018-224198, filed on Nov. 29, 2018 and Japanese Patent Application No. 2019-120424, filed on Jun. 27, 2019, the contents of which are incorporated herein by reference in their entirety.

BACKGROUND OF THE INVENTION

1. Field of the Invention

The present invention relates to an information processing apparatus, an information processing method, and an image forming system.

2. Description of the Related Art

In the related art, application programs (hereinafter also referred to as applications) for implementing various image processing functions such as printing and scanning in an image forming apparatus such as a multifunction peripheral (MFP), have been developed.

The image forming apparatus includes an application (also referred to as middleware) that includes an Application Programming Interface (API) group used by a third-party vendor, etc., for developing an application that provides a user interface (UI) relating to image processing (for example, Patent Document 1). By using the API group of the middleware, the third-party vendor can easily develop an application for providing a UI relating to image processing.

Patent Document 1: Japanese Unexamined Patent Application Publication No. 2014-150320

SUMMARY OF THE INVENTION

According to one aspect of the present invention, there is provided an information processing apparatus including first processing circuitry; and a first memory storing computer-executable instructions that cause the first processing circuitry to: accept, by an application, an instruction to cause an image forming apparatus to execute image processing; give, by a print framework, an instruction to execute the image processing to the image forming apparatus; and cause, by a first function providing application, the print framework to give the instruction to execute the image processing to the image forming apparatus, upon receiving a call from the application.

BRIEF DESCRIPTION OF THE DRAWINGS

FIG. 13 is a diagram illustrating an example of a screen for selecting a print framework according to an embodiment of the present invention;

DETAILED DESCRIPTION OF THE PREFERRED EMBODIMENTS

The middleware for an image forming apparatus can only be operated on the platform of the image forming apparatus, and has not been applied to other platforms (for example, an information processing apparatus such as a smart device).

Therefore, it has been difficult for a developer of an application for an information processing apparatus, to create and customize an application for the information processing apparatus to instruct a job such as printing and scanning to an image forming apparatus.

A problem to be addressed by an embodiment of the present invention is to easily develop an application for operating an image forming apparatus.

Hereinafter, embodiments of the present invention will be described with reference to the drawings.

<Example of Overall Configuration>

Figure 1:
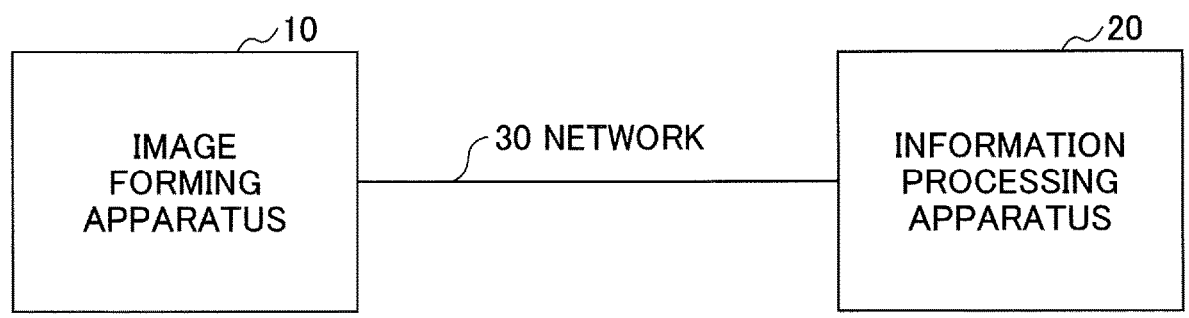
FIG. 1 is a diagram illustrating an example of the overall configuration of an image forming system according to an embodiment of the present invention.

FIG. 1 is a diagram illustrating an example of the overall configuration of an image forming system 1 according to the present embodiment. As illustrated in FIG. 1, the image forming system 1 according to an embodiment of the present invention includes one or more image forming apparatuses 10 and one or more information processing apparatuses 20. Further, the image forming apparatus 10 and the information processing apparatus 20 can be connected to each other in a communicable manner through any network 30.

The image forming apparatus 10 is an electronic device such as a multifunction peripheral. The image forming apparatus 10 is not limited to a multifunction peripheral. For example, the image forming apparatus 10 may be a projector (PJ), an Interactive White Board (IWB: a white board having an electronic white board function capable of mutual communication), an output device such as a digital signage, a Head Up Display (HUD) device, an industrial machine, a manufacturing device, an imaging device, a sound collecting device, a medical device, a network appliance, a personal notebook computer (PC), a mobile phone, a smartphone, a tablet terminal, a game machine, a Personal Digital Assistant (PDA), a digital camera, a wearable PC, or a desktop PC.

The information processing apparatus 20 is a personal computer (PC), a smartphone, a tablet terminal, or the like. As will be described later, the information processing apparatus 20 is used to instruct the image forming apparatus 10 to perform a job such as printing or scanning. For example, the information processing apparatus 20 is a mobile terminal held by a user of the image forming apparatus 10.

The configuration of the image forming system 1 illustrated in FIG. 1 is an example, and the image forming system 1 may have other configurations.

<Example of Hardware Configuration of Image Forming Apparatus 10>

Figure 2:
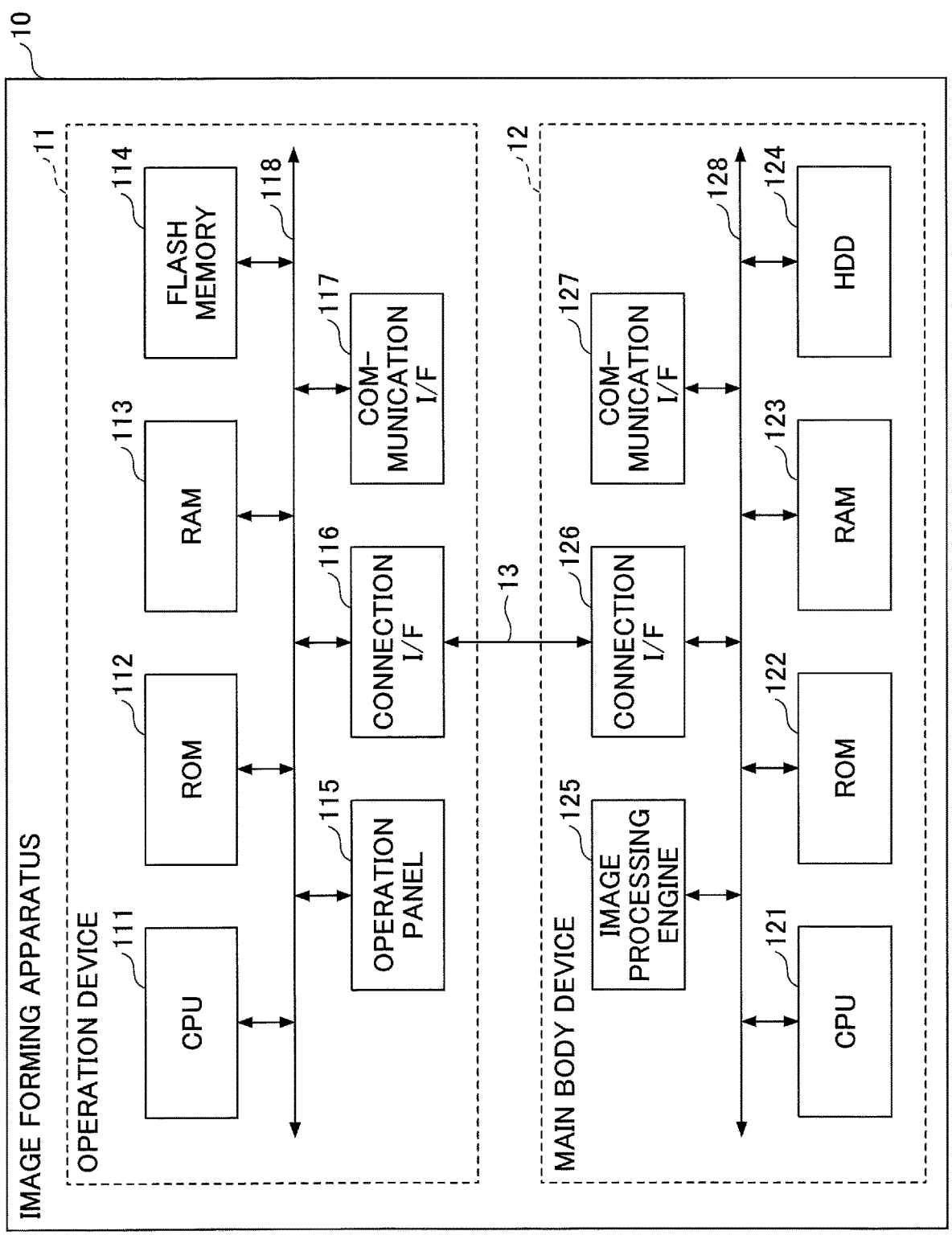
FIG. 2 is a diagram illustrating an example of a hardware configuration of an image forming apparatus according to an embodiment of the present invention.

FIG. 2 is a diagram illustrating an example of a hardware configuration of the image forming apparatus 10 according to the present embodiment. As illustrated in FIG. 2, the image forming apparatus 10 according to an embodiment of the present invention includes an operation device 11 and a main body device 12.

The operation device 11 is used when a user performs various operations such as selecting an image processing function to be executed by the main body device 12, inputting various setting values for executing the image processing function, inputting an execution instruction for starting execution of the image processing function, switching the display screen, etc.

The main body device 12 executes various processes such as executing an image processing function in accordance with various operations by a user on the operation device 11.

As illustrated in FIG. 2, the operation device 11 of the image forming apparatus 10 includes a central processing unit (CPU) 111, a read-only memory (ROM) 112, and a random access memory (RAM) 113. Further, the operation device 11 includes a flash memory 114, an operation panel 115, a connection interface (I/F) 116, and a communication I/F 117. These pieces of hardware are interconnected with each other via a bus 118.

The CPU 111 is an arithmetic device that controls the entire operation device 11 by executing various programs stored in the ROM 112 or the flash memory 114 by using the RAM 113 as a work area.

The ROM 112 is a non-volatile semiconductor memory (storage device) that can hold data even when the power is turned off. Further, the RAM 113 is a volatile semiconductor memory (storage device) that temporarily holds programs and data.

The flash memory 114 is a non-volatile storage device and stores various programs to be executed by the CPU 111 (for example, programs for implementing the present embodiment) and various kinds of data.

The operation panel 115 is used by the user to perform various operations. The operation panel 115 displays various screens or the like to the user.

The connection I/F 116 is an interface for communicating with the main body device 12 via a communication path 13. For example, the interface of the Universal Serial Bus (USB) standard is used for the connection I/F 116.

The communication I/F 117 is an interface for communicating with other devices. For example, a wireless Local Area Network (LAN) is of the Wi-Fi standard used for the communication I/F 117.

Similarly, the main body device 12 of the image forming apparatus 10 includes a CPU 121, a ROM 122, and a RAM 123. The main body device 12 includes a hard disk drive (HDD) 124, an image processing engine 125, a connection I/F 126, and a communication I/F 127. These pieces of hardware are interconnected with each other via a bus 128.

The CPU 121 is an arithmetic device that controls the entire main body device 12 by executing various programs stored in the ROM 122 or the HDD 124 by using the RAM 123 as a work area.

The ROM 122 is a non-volatile semiconductor memory (storage device) that can hold data even when the power is turned off. The RAM 123 is a volatile semiconductor memory (storage device) that temporarily holds programs and data.

The HDD 124 is a non-volatile storage device and stores various programs to be executed by the CPU 121 (for example, programs for implementing the present embodiment) and various kinds of data.

The image processing engine 125 is hardware that performs image processing for implementing various image processing functions such as a printing function, a scanning function, a copy function, and a fax function.

The image processing engine 125 includes, for example, a plotter for printing information onto a sheet of paper or the like, a scanner for optically reading an original document to generate image data, and a fax communication device for performing fax communication. The image processing engine 125 may include, for example, a finisher for sorting the printed sheet materials or an automatic document feeder (ADF) for automatically feeding the original document.

The connection I/F 126 is an interface for communicating with the operation device 11 via the communication path 13. For example, an interface of the USB standard is used for the connection I/F 126.

The communication I/F 127 is an interface for communicating with other devices. For example, a wireless LAN of the Wi-Fi standard is used for the communication I/F 127.

The image forming apparatus 10 according to the present embodiment has the hardware configuration illustrated in FIG. 2, and can thus implement various processes described later.

In FIG. 2, the configuration in which the image forming apparatus 10 includes the operation device 11 is illustrated as an example. However, as will be described later, the information processing apparatus 20, such as a tablet terminal, a smartphone, a mobile phone, or a PDA, can function as an operation device of the image forming apparatus 10. That is, each of these information processing apparatuses 20 can control the image forming apparatus 10 by communicating with the image forming apparatus 10 via the communication I/F 117 of the operation device 11 or the communication I/F 127 of the main body device 12.

<Hierarchical Structure of Software Groups of Image Forming Apparatus 10>

Figure 3:
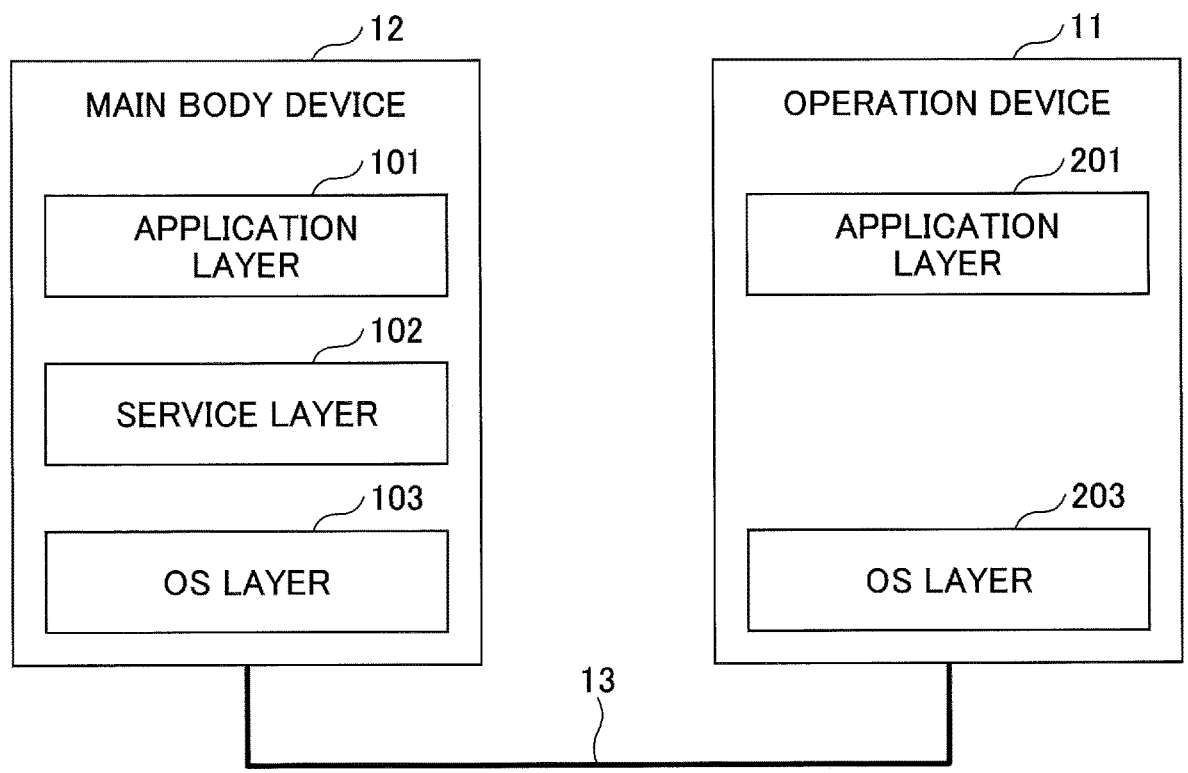
FIG. 3 is a diagram illustrating an example of a hierarchical structure of software groups included in an operation device and a main body device of the image forming apparatus according to an embodiment of the present invention.

FIG. 3 is a diagram illustrating an example of a hierarchical structure of software groups included in the operation device 11 and the main body device 12 of the image forming apparatus 10 according to the present embodiment.

FIG. 3 illustrates a hierarchical structure of software groups included in the operation device 11 and a hierarchical structure of software groups included in the main body device 12.

As illustrated in FIG. 3, the main body device 12 includes an application layer 101, a service layer 102, and an operating system (OS) layer 103. The entities of the application layer 101, the service layer 102, and the OS layer 103 are various types of software stored in the ROM 122 or the HDD 124, etc. The CPU 121 executes this software to provide various functions.

The software of the application layer 101 is application software (also referred to simply as an "application" in the following description) for operating hardware resources to provide predetermined functions. Examples of the application include a copy application for providing a copy function, a scanner application for providing a scanner function, a fax application for providing a facsimile function, a printer application for providing a printing function, or the like.

The software of the service layer 102 is software that is interposed between the application layer 101 and the OS layer 103 and provides the application with an interface for using the hardware resources included in the main body device 12. Specifically, this software provides a function for accepting an operation request for hardware resources and for arbitrating the operation request. The operation request accepted by the service layer 102 is, for example, a request for reading with the scanner or printing with a plotter, etc.

The function of the interface by the service layer 102 is provided not only to the application layer 101 of the main body device 12 but also to the application layer 201 of the operation device 11. That is, the application layer 201 (application) of the operation device 11 can also implement a function using the hardware resource (for example, the image processing engine 125) of the main body device 12 via the interface function of the service layer 102.

The software of the OS layer 103 is basic software (operating system) for providing basic functions for controlling the hardware included in the main body device 12. The software of the service layer 102 converts a request for using hardware resources from various applications into commands that can be interpreted by the OS layer 103 and transfers the commands to the OS layer 103. Then, when the command is executed by the software of the OS layer 103, the hardware resource performs the operation according to the request of the application.

Similarly, the operation device 11 includes an application layer 201 and an OS layer 203. With respect to the application layer 201 and the OS layer 203 included in the operation device 11, the hierarchical structure is the same as that of the main body device 12. However, the type of operation request that can be accepted by the function provided by the application of the application layer 201 is different from that of the main body device 12. The application of the application layer 201 is software for operating the hardware resources provided by the operation device 11 to provide predetermined functions. For example, the application of the application layer 201 is software for providing the functions of the user interface (UI) for performing operations and display relating to the functions (copy function, scanner function, facsimile function, and printer function) included in the main body device 12.

In the present embodiment, the software of the OS layer 103 on the main body device 12 side and the software of the OS layer 203 on the operation device 11 side are different from each other, in order to maintain the functional independence. As an example, Linux (registered trademark) is provided as the software of the OS layer 103 on the main body device 12 side, and Android (registered trademark) is provided as the software of the OS layer 203 on the operation device 11 side. Thus, the main body device 12 and the operation device 11 operate independently of each other by separate operating systems.

By operating the main body device 12 and the operation device 11 by separate operating systems, the communication between the main body device 12 and the operation device 11 can be performed as communication between different devices, rather than inter-process communication within a common device. An operation (command communication) in which the input accepted by the operation device 11 (the instruction content from the user) is transmitted to the main body device 12, and an operation in which the main body device 12 reports an event to the operation device 11 or the like correspond to such communication. Here, the function of the main body device 12 can be used by having the operation device 11 communicate a command to the main body device 12. Further, an event that is reported from the main body device 12 to the operation device 11 may be the execution status of an operation in the main body device 12 and a content set on the main body device 12 side.

<Software Provided in Image Forming Apparatus 10>

Figure 4:
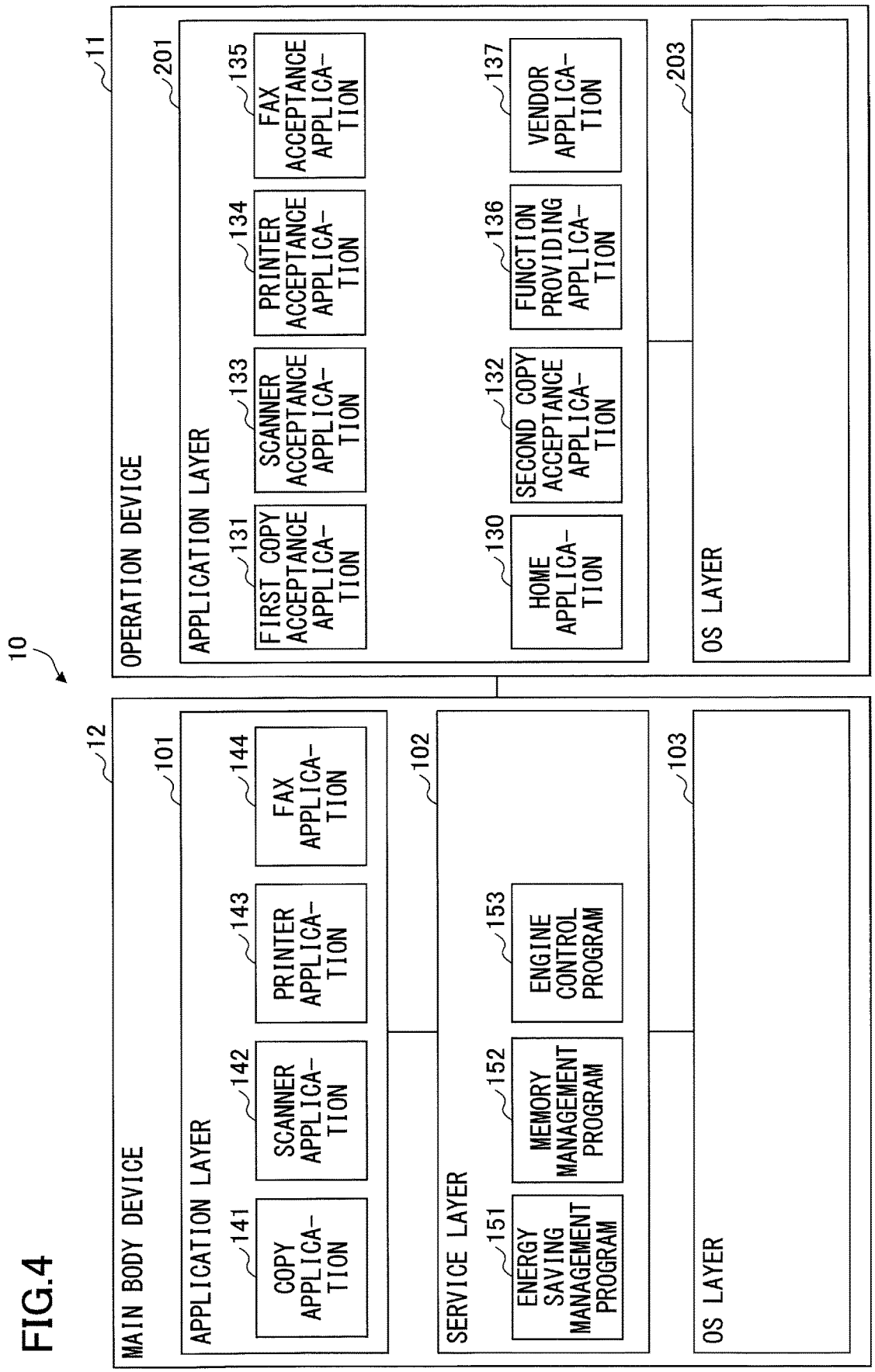
FIG. 4 is a diagram illustrating an example of software provided in the image forming apparatus according to an embodiment of the present invention.

FIG. 4 illustrates an example of software provided in the image forming apparatus 10 according to the present embodiment. As discussed above, the main body device 12 is divided into the application layer 101, the service layer 102, and the OS layer 103. Among these, the application layer 101 stores applications that control the image processing engine 125 illustrated in FIG. 2 to perform reading control, print control, or the like, with respect to documents. Specifically, the application layer 101 stores a copy application 141, a scanner application 142, a printer application 143, and a fax application 144. The copy application 141, the scanner application 142, the printer application 143, and the fax application 144 are job execution function applications that are installed as standard applications.

The service layer 102 stores various programs corresponding to processes that are commonly performed by the respective applications, such as an energy saving management program 151, a memory management program 152, and an engine control program 153. The service layer 102 performs processes that are commonly performed by the respective applications, such as energy saving management and memory management.

On the other hand, the operation device 11 is divided into the application layer 201 and the OS layer 203. The difference between the main body device applications and the operation device applications is that the applications of the main body device perform image processing engine control to control the functions of the image forming apparatus 10, for example, reading and printing; while the applications of the operation device perform UI control. That is, the operation device application displays a screen to accept a user's operation, and the main body device application performs image processing engine controls based on the user's operation.

Among the operation device applications, there may be a plurality of applications that implements the same function. This is a case in which the UI design (appearance) or the installed function is changed, for applications implementing the same function. In the example of FIG. 4, as an example, a first copy acceptance application 131 and a second copy acceptance application 132 are present in the operation device 11. The second copy acceptance application 132 has fewer functions than the first copy acceptance application 131 and has a UI having a simplified appearance.

Similar to the relationship between the first copy acceptance application 131 and the second copy acceptance application 132, for example, there is a vendor application 137 developed by a developing vendor, with respect to a scanner application or the like. Further, in order to facilitate the development of the vendor application 137, there is provided a function providing application 136 that provides, to a vendor or the like, functions equivalent to the first copy acceptance application 131, the second copy acceptance application 132, a scanner acceptance application 133, a printer acceptance application 134, and a fax acceptance application 135 of the operation device 11.

That is, the application layer 201 of the operation device 11 stores an application that accepts user operations via a user interface. Specifically, the application layer 201 stores a home application 130, the first copy acceptance application 131, the second copy acceptance application 132, the scanner acceptance application 133, the printer acceptance application 134, the fax acceptance application 135, the function providing application 136, and the vendor application 137. The function providing application 136 is an example of an image processing program. Further, the function providing application 136 is stored in a storage unit such as the ROM 112, the RAM 113, or the flash memory 114 of the operation device 11, as an example.

The home application 130 displays a main screen (an initial screen) in which icons or the like are arranged for specifying a desired operation. Then, an application, which is specified by the user via an icon operation, is activated. The first copy acceptance application 131 is an application that accepts a user's copy operation via operation buttons and setting buttons. The second copy acceptance application 132 is an application in which the operation buttons and setting buttons, etc., that are frequently used are mainly displayed, thereby reducing the number of operation buttons and setting buttons to be displayed compared to the first copy acceptance application 131, thereby improving visibility and operability. The scanner acceptance application 133 is an application that accepts a user's scanner operation via operation buttons and setting buttons or the like. The printer acceptance application 134 is an application that accepts a user's printer operation via operation buttons and setting buttons or the like. The fax acceptance application 135 is an application that accepts a user's facsimile transmission and reception operation via operation buttons and setting buttons or the like.

In order to facilitate the development of the vendor application 137 as described above, the function providing application 136 provides, to a vendor or the like, functions equivalent to the first copy acceptance application 131, the second copy acceptance application 132, the scanner acceptance application 133, the printer acceptance application 134, and the fax acceptance application 135, of the operation device 11.

That is, in the case where the function providing application 136 is an application corresponding to, for example, the scanner application 142, a function for displaying a user interface, such as a regular operation menu and setting menu, is provided to a vendor. Further, in the case where the function providing application 136 is an application corresponding to, for example, the printer application 143, a function for displaying a user interface, such as a regular operation menu and a setting menu, is provided to the vendor.

As described above, the operation device 11 of the image forming apparatus 10 is provided with the function providing application 136 for providing, to a vendor, etc., functions equivalent to the first copy acceptance application 131, the second copy acceptance application 132, the scanner acceptance application 133, the printer acceptance application 134, and the fax acceptance application 135 of the operation device 11. For the developing vendor of the vendor application 137, an Application Programming Interface (API) that implements the functions of the function providing application 136, is disclosed.

<Example of Hardware Configuration of Information Processing Apparatus 20>

Figure 5:
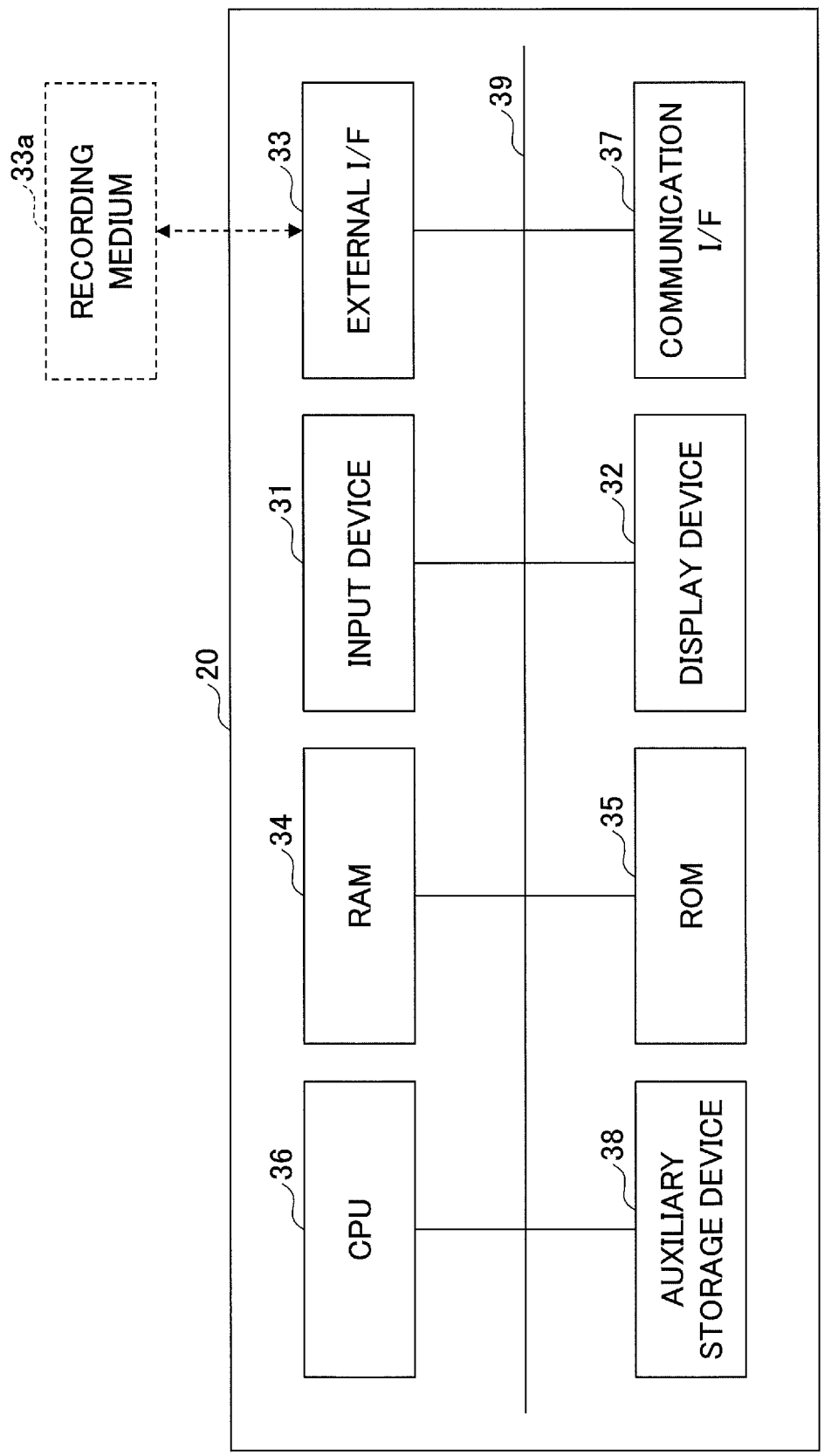
FIG. 5 is a diagram illustrating an example of a hardware configuration of an information processing apparatus according to an embodiment of the present invention.

FIG. 5 is a diagram illustrating an example of the hardware configuration of the information processing apparatus 20 according to the present embodiment.

As illustrated in FIG. 5, the information processing apparatus 20 includes an input device 31, a display device 32, an external I/F 33, a RAM 34, a ROM 35, a CPU 36, a communication I/F 37, and an auxiliary storage device 38. These pieces of hardware are communicatively connected via a bus 39.

The input device 31 may be, for example, a keyboard, a mouse, a touch panel, or the like, and is used by a user to input various operations. The display device 32 is, for example, a display, and displays the processing results of the information processing apparatus 20.

The external I/F 33 is an interface with external devices. The external device includes a recording medium 33a or the like. The information processing apparatus 20 can read and write information in the recording medium 33a or the like via the external I/F 33.

The recording medium 33a includes, for example, a flexible disk, a Compact Disc (CD), a Digital Versatile Disk (DVD), an SD (Secure Digital) memory card, a Universal Serial Bus (USB) memory card, or the like.

The RAM 34 is a volatile semiconductor memory that temporarily holds programs and data. The ROM 35 is a non-volatile semiconductor memory that can hold programs and data even when the power is turned off. For example, OS settings and network settings are stored in the ROM 35.

The CPU 36 is an arithmetic device that loads the programs and data from the ROM 35, the auxiliary storage device 38, or the like, into the RAM 34, and executes processing.

The communication I/F 37 is an interface for connecting the information processing apparatus 20 to the network 30. The auxiliary storage device 38 is, for example, a hard disk drive (HDD) or a solid state drive (SSD), and is a non-volatile storage device that stores programs and data. The programs and data stored in the auxiliary storage device 38 include, for example, an OS and application programs that implement various functions on the OS.

<Software Provided in Information Processing Apparatus 20 and Image Forming Apparatus 10>

Figure 6:
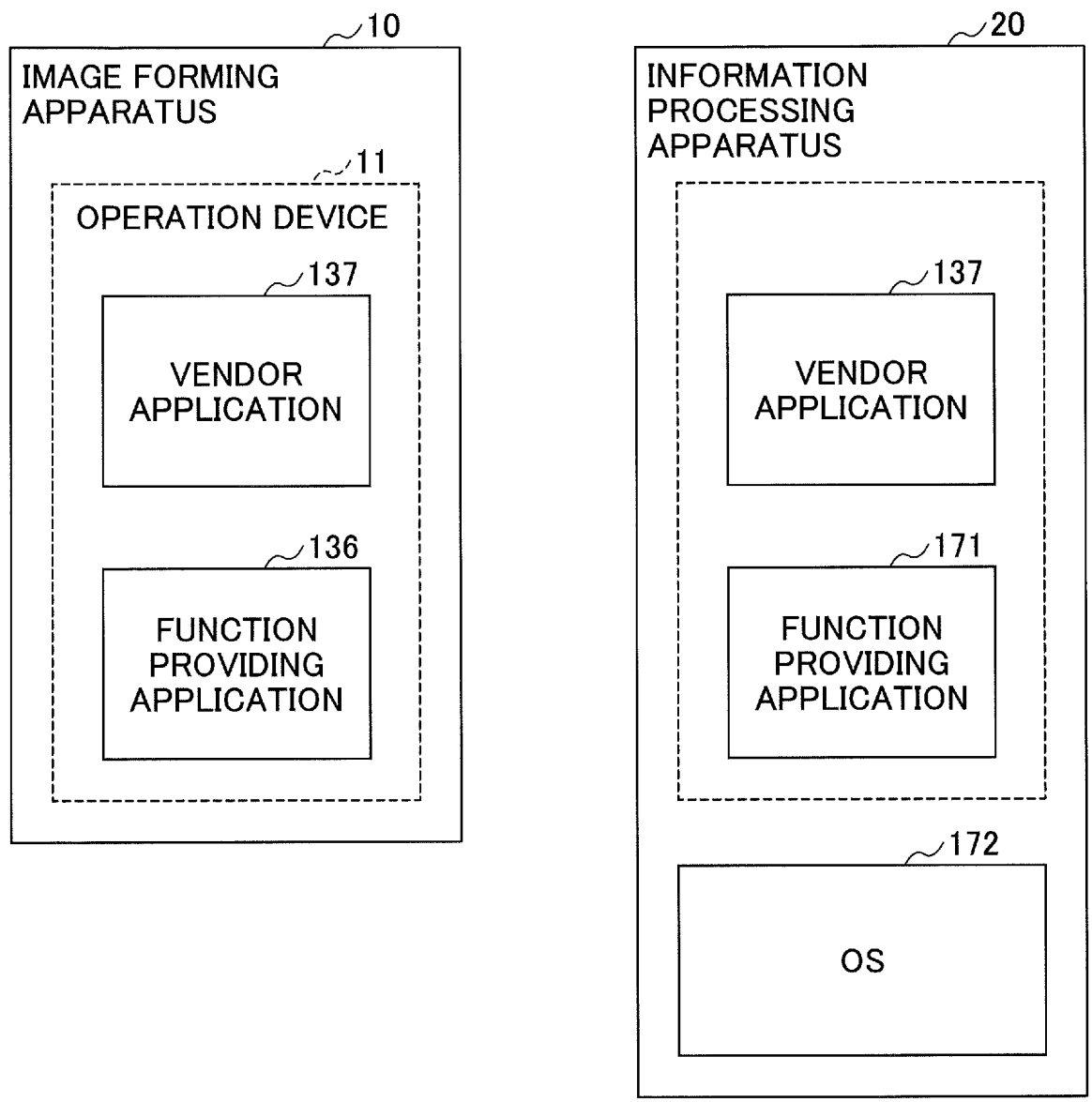
FIG. 6 is a diagram illustrating an example of software provided in the information processing apparatus and the image forming apparatus according to an embodiment of the present invention.

FIG. 6 is a diagram illustrating an example of software provided in the information processing apparatus 20 and the image forming apparatus 10 according to the present embodiment. According to the present embodiment, the information processing apparatus 20, such as a tablet terminal, a smartphone, a mobile phone, or a PDA, can function as an operation device of the image forming apparatus 10. That is, the information processing apparatus 20 can control the image forming apparatus 10 by communicating with the image forming apparatus 10 via the communication I/F 117 of the operation device 11 or the communication I/F 127 of the main body device 12.

As described above, in the operation device 11 of the image forming apparatus 10, the vendor application 137 and the function providing application 136 are stored.

On the other hand, the information processing apparatus 20 stores the vendor application 137 that is the same as the vendor application of the image forming apparatus 10. As described above, according to the present embodiment, the image forming apparatus 10 can be operated by the vendor application 137 that is common among the operation device 11 and the information processing apparatus 20.

The information processing apparatus 20 stores a function providing application 171 for facilitating the development of the vendor application 137. To the developing vendor of the vendor application 137, an API that implements the functions of the function providing application 171 is disclosed. The function providing applications 171 and 136 each have a UI layer, a logic layer for constructing logic such as execution of a job, and an API layer. The UI layer is the same among a plurality of types of apparatuses (that is, the information processing apparatus 20 and the image forming apparatus 10 of a plurality of types of OS's), and the logic layer and the API layer differ among a plurality of types of apparatuses (that is, the information processing apparatus 20 and the image forming apparatus 10 of a plurality of types of OS's). That is, the same UI screen is provided among a plurality of types of apparatuses according to the UI layer, but internally, different processes are executed in the respective apparatuses according to the logic layer and the API layer, to instruct image processing, so that the user's sense of operation is common for the respective apparatuses. Specifically, the user's sense of operation can be made common, when image processing instructions are respectively given from the information processing apparatuses 20 of different OS's to the image forming apparatus 10, and when an image processing instruction is given from the operation device 11 to the main body device 12 of the image forming apparatus 10.

Further, the information processing apparatus 20 stores basic software (operating system: OS) 172.

The function providing application 171 of the information processing apparatus 20 may be an application for each of the OS's 172 (for example, Android, iOS, etc.) of the information processing apparatus 20, or may correspond to multiple platforms (for example, multiple types of the OS's 172).

<Functions of Function Providing Application 171>

Figure 7:
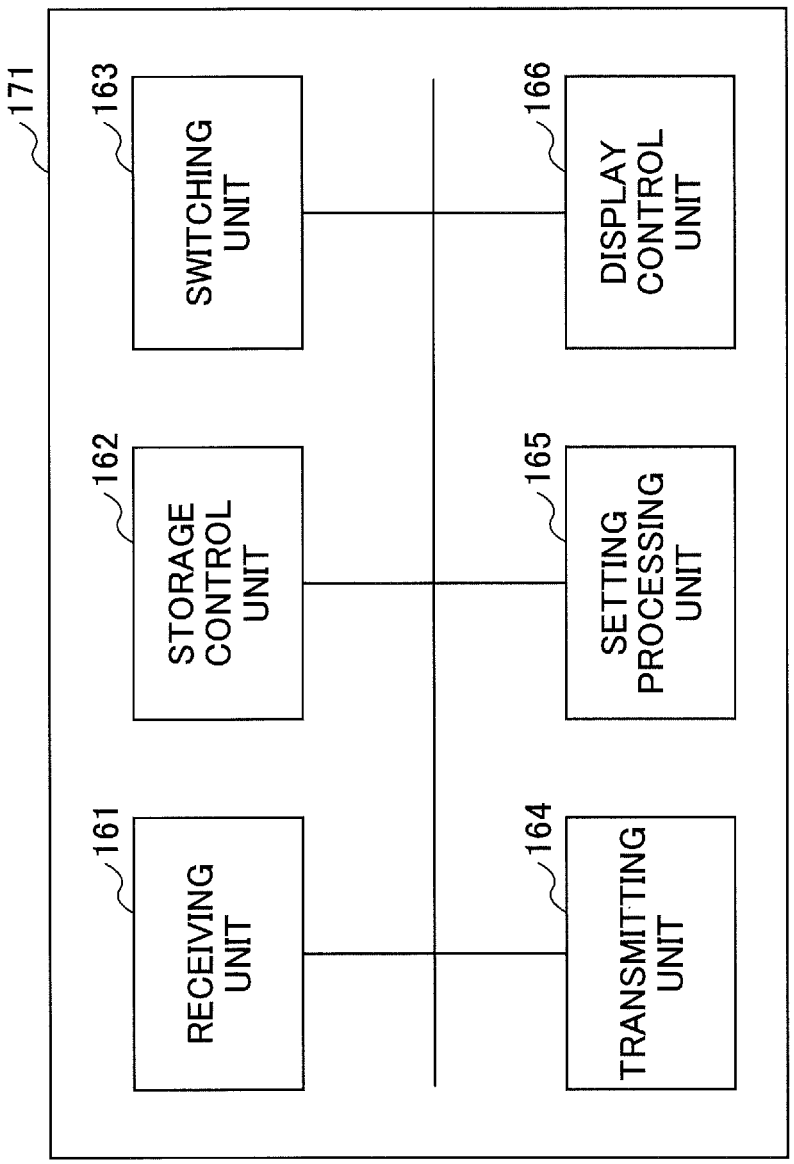
FIG. 7 is a diagram illustrating an example of function blocks of a function providing application according to an embodiment of the present invention.

FIG. 7 is a diagram illustrating an example of function blocks of the function providing application 171 according to the present embodiment. The CPU 36 of the information processing apparatus 20 executes the function providing application 171 stored in a storage unit, for example, the ROM 35, the RAM 34, or the auxiliary storage device 38, to implement a receiving unit 161, a storage control unit 162, a switching unit 163, a transmitting unit 164, a setting processing unit 165, and a display control unit 166 illustrated in FIG. 7.

The receiving unit 161 receives a command corresponding to an input operation performed by the user via the input device of the information processing apparatus 20, and receives an execution result obtained making an execution request to the main body device 12.

The storage control unit 162 reads out or stores the information corresponding to the application for which a screen display request has been made, from a storage unit, for example, the ROM 35, the RAM 34, or the auxiliary storage device 38.

The switching unit 163 switches the screen displayed on the display device of the information processing apparatus 20 in accordance with an operation made to the input device of the information processing apparatus 20 by a user.

The transmitting unit 164 transmits a request for executing a desired operation, etc., to the main body device 12.

The setting processing unit 165 performs setting processing such as reporting, to the vendor application 137, the setting contents set by a user via a setting screen.

The display control unit 166 performs display control, such as displaying a main screen or a setting screen, on a display device of the information processing apparatus 20.

Note that in this example, the receiving unit 161, the storage control unit 162, the switching unit 163, the transmitting unit 164, the setting processing unit 165, and the display control unit 166 are implemented by software; however, part of or all of the receiving unit 161, the storage control unit 162, the switching unit 163, the transmitting unit 164, the setting processing unit 165, and the display control unit 166 may be implemented by hardware such as an integrated circuit (IC).

Further, the function providing application 171 may be provided by being recorded in a file in an installable or executable format in a computer-readable recording medium such as a Compact Disk Read-Only Memory (CD-ROM) or a flexible disk (FD). Further, the function providing application 171 may be provided by being recorded in a computer-readable recording medium such as CD recordable (CD-R), a DVD, Blu-ray Disk (registered trademark), a semiconductor memory, or the like. Further, the function providing application 171 may be provided by being installed via a network such as the Internet. Further, the function providing application 171 may be provided by being incorporated in advance into a ROM or the like inside a device.

<Details of Processing>

Next, the operation of the function providing application 171 will be described.

First Processing Example

Figure 8:
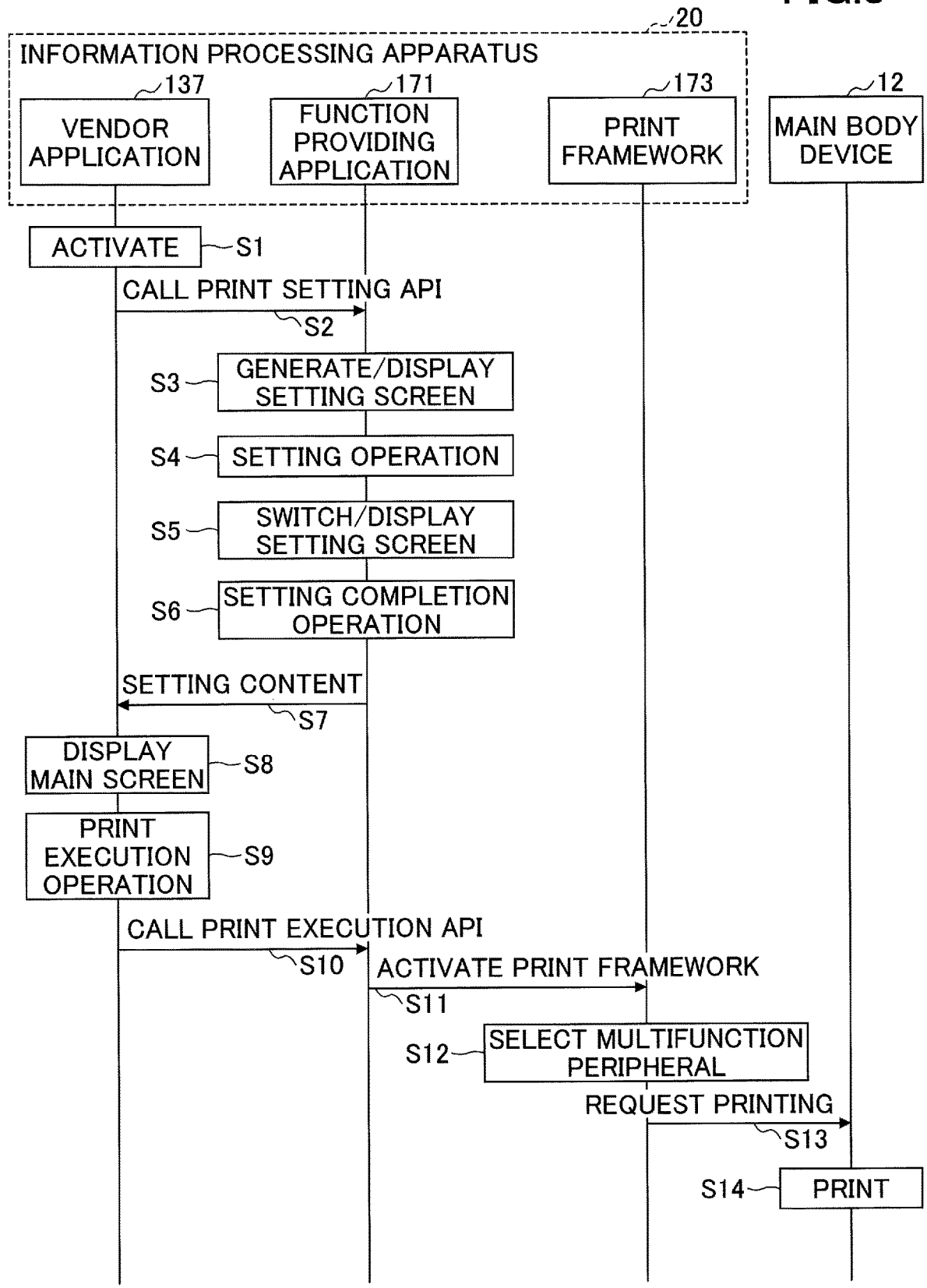
FIG. 8 is a sequence diagram illustrating an example of image processing according to an embodiment of the present invention.

FIG. 8 is a sequence diagram illustrating an example of image processing (for example, printing) according to the present embodiment. FIG. 8 is a sequence diagram illustrating a flow of an operation of the function-providing application 171 of the information processing apparatus 20 when printing is executed by the vendor application 137.

In step S1, the vendor application 137 is activated. The vendor application 137 is an application for accepting an instruction for image processing with respect to the image forming apparatus 10. The user operates an icon for instructing the activation of the vendor application 137 displayed on the display device of the information processing apparatus 20. An instruction signal for instructing the activation of the vendor application 137 is transmitted to the vendor application 137. Accordingly, the vendor application 137 displays a main screen on the display device of the information processing apparatus 20.

When making print settings, the user operates a print setting button displayed on the main screen. Accordingly, a signal indicating that the print setting button has been operated, is supplied to the vendor application 137.

In step S2, when the vendor application 137 receives the signal indicating that the print setting button has been operated, the vendor application 137 makes a call for a print setting API to the function providing application 171.

Figure 9:
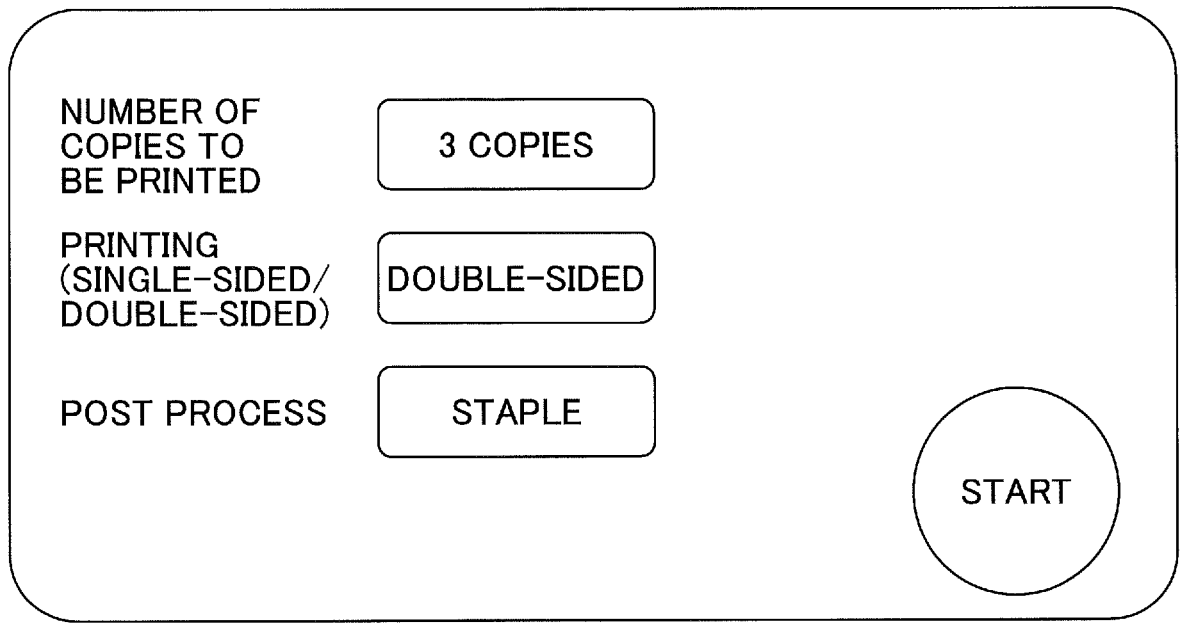
FIG. 9 is a diagram illustrating an example of a setting screen for making print settings according to an embodiment of the present invention.

In step S3, the setting processing unit 165 of the function providing application 171 generates a setting screen for making a print setting. The display control unit 166 of the function providing application 171 displays the generated setting screen on the display device of the information processing apparatus 20. FIG. 9 is a diagram illustrating an example of a setting screen for making a print setting. As illustrated in FIG. 9, the setting processing unit 165 generates a setting screen including icons corresponding to various setting items related to printing and a setting completion button which is operated when the setting is completed.

In step S4, when the user operates an icon corresponding to a desired setting item, among the icons corresponding to various setting items displayed in the above-described setting screen, a signal indicating the setting item operated by the user is supplied to the function providing application 171. The function providing application 171 receives the signal indicating the setting item operated by a user, by the receiving unit 161.

In step S5, the function providing application 171 switches the screen to a setting screen of the setting item operated by the user, by the switching unit 163. The function providing application 171 displays the setting screen to which the screen has switched on the display device of the information processing apparatus 20 by the display control unit 166. As described above, in the present embodiment, the print setting top screen and the detailed setting screen that transitions from the print setting top screen, etc., are all implemented by the function providing application 171. Note that some of the screens among the print setting top screen and the detailed setting screen that transitions from the print setting top screen, etc., may be implemented by the vendor application 137.

In step S6, the receiving unit 161 of the function providing application 171 receives the setting content information indicating the setting contents set by the user, together with a signal indicating that the setting completion button has been operated.

In step S7, the transmitting unit 164 of the function providing application 171 transmits the received setting content information to the vendor application 137. The vendor application 137 updates the setting content information stored in the storage unit such as the ROM 35, the RAM 34, or the auxiliary storage device 38, with the received setting content information.

In step S8, when the setting content information is stored, the vendor application 137 displays the main screen on the display device of the information processing apparatus 20.

In step S9, when executing printing, the user operates a print execution button displayed on the main screen. Accordingly, a signal indicating that the print execution button has been operated, is supplied to the vendor application 137.

In step S10, when the vendor application 137 receives the signal indicating that the print execution button has been operated, the vendor application 137 makes a call for a print execution API to the function providing application 171. Further, the vendor application 137 reads the above-described setting content information from the storage unit and transmits the setting content information to the function providing application 171.

In step S11, the transmitting unit 164 of the function providing application 171 activates a print framework 173 of the information processing apparatus 20. The print framework 173 is a program that instructs the execution of printing from the information processing apparatus 20, such as Google Cloud Print, Air Print, Mopria, or the like.

The print framework 173 may be provided by using a plug-in module program that is plugged into the OS 172 or the like of the information processing apparatus 20. The plug-in module is provided to the information processing apparatus 20 for each standard of the print framework 173. Each application of the information processing apparatus 20, for example, a file viewing application, a file editing application, a browser application, a mail application, a Social Networking Service (SNS) application or the like, can instruct image processing (scanning, copying, printing, or the like) to the image forming apparatus 10 supporting the standard, via the plug-in module, by direct communication or through the Internet. A plurality of the plug-in modules of the print framework 173 may be respectively provided for different standards in the information processing apparatus 20. The plug-in module is provided to the information processing apparatus 20 by being obtained as an individual application from a web site or the like of each standard, or by being included as an OS module at the time of updating the OS 172 of the information processing apparatus 20, and the plug-in module becomes usable from an application of the information processing apparatus 20. When one or more print frameworks 173 are plugged in or registered in the OS 172 of the information processing apparatus 20, the OS 172 stores and manages the name or identification information of the print framework 173, and, therefore, when the print framework 173 is called from an application or the like, the OS 172 can display a list of the names or the like of the print frameworks 173. Note that this configuration can be expressed as the OS 172 has a single print framework, and plug-in modules respectively corresponding to a plurality of standards are included within the print framework.

Further, a plurality of the print frameworks 173 may be provided as web applications for the respective standards on the Internet, without being added to the information processing apparatus 20. In this case, the information processing apparatus 20 can instruct image processing to at least one of the image forming apparatus 10 that is pre-registered in the web application, etc., and the image forming apparatus 10 supporting the standard, via a web application (print framework) via the Internet by using a web browser or a web cooperation application of the information processing apparatus 20.

Figure 10:
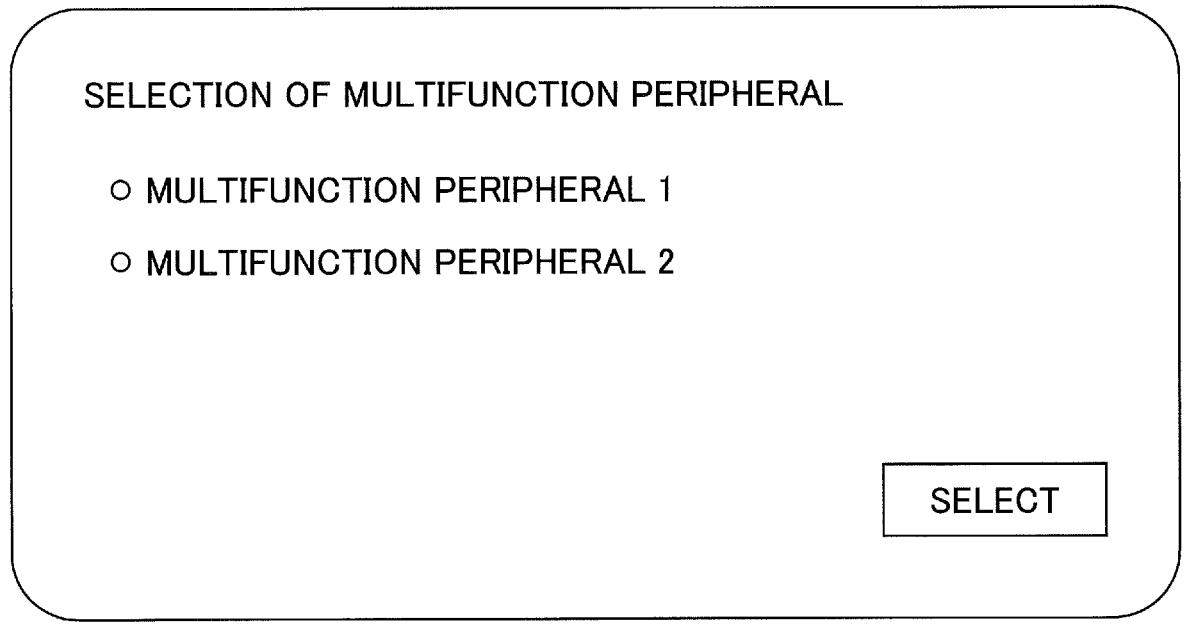
FIG. 10 is a diagram illustrating an example of a screen for selecting an image forming apparatus according to an embodiment of the present invention.

In step S12, the OS 172 of the information processing apparatus 20 having the print framework 173 or the plug-in of the print framework 173, generates a screen for selecting the image forming apparatus 10 such as a multifunction peripheral. The print framework 173 displays the generated screen on the display device of the information processing apparatus 20. FIG. 10 is a diagram illustrating an example of a screen for selecting the image forming apparatus 10. When the user selects the multifunction peripheral to be actually used for printing on the screen and presses the select button, a print request is issued with respect to the selected multifunction peripheral. A list of registered multifunction peripherals is displayed on the screen of FIG. 10, by having the user register, in advance, the multifunction peripherals by the initial settings of the print framework 173. Alternatively, in step S11, in addition to activating the print framework 173, the information processing apparatus 20 may search for the image forming apparatuses 10 connected to a network such as WiFi by wireless communication, and display a list of the image forming apparatuses 10 (multifunction peripherals) detected as a result of the search as illustrated in FIG. 10.

Figure 11:
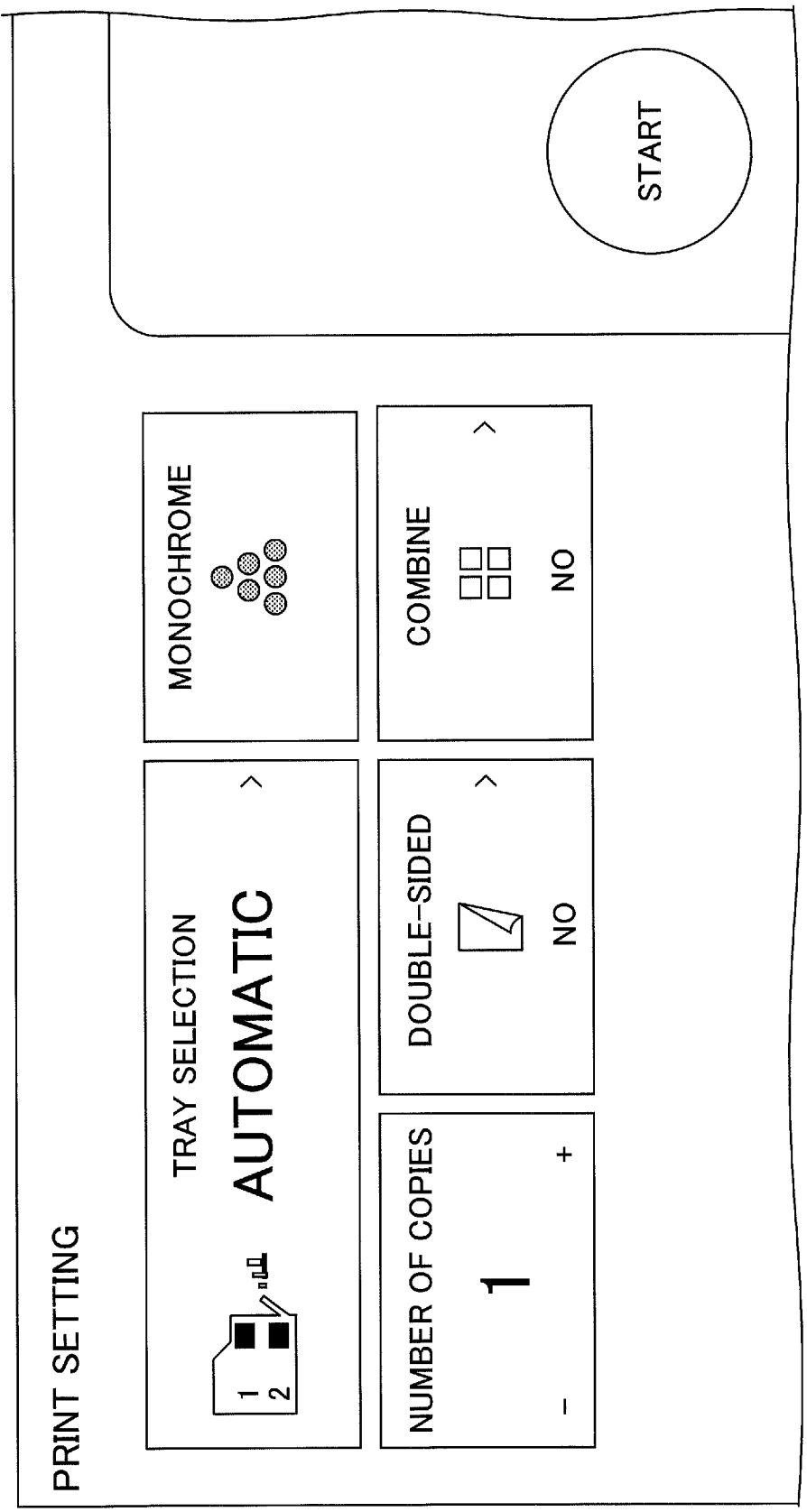
FIG. 11 is a diagram illustrating an example of a setting screen for making print settings according to an embodiment of the present invention.

Note that before displaying the screen of the print framework 173 as in FIG. 10, the function providing application 171 may display a screen as in FIG. 11. As illustrated in FIG. 11, a print setting screen is displayed and a user can freely change the setting. After changing the setting, by pressing the start button, the multifunction peripheral selection screen illustrated in FIG. 10 is displayed. Whether the screen such as that illustrated in FIG. 11 is to be displayed or not, can be specified by a parameter when the vendor application 137 calls the function providing application 171.

In step S13, the print framework 173 transmits the setting content information and the print execution request to the main body device 12 of the image forming apparatus 10.

In step S14, the main body device 12 controls the printing function of the image processing engine 125 based on the setting content information. Accordingly, a substantial printing operation is executed.

Note that when the storage control unit 162 of the function providing application 171 stores the setting content information, which is input by a user via the input device of the information processing apparatus 20, in the storage unit described above, and the printing execution API is called from the vendor application 137, the storage control unit 162 of the function providing application 171 may read the setting content information from the storage unit and transmit the setting content information to the main body device 12.

As described above, the function providing application 171 accepts the user's instruction via the vendor application 137 in the information processing apparatus 20, and transfers the instruction to the print framework 173, and can thereby transmit an instruction to execute image processing to the image forming apparatus 10.

Second Processing Example

Figure 12:
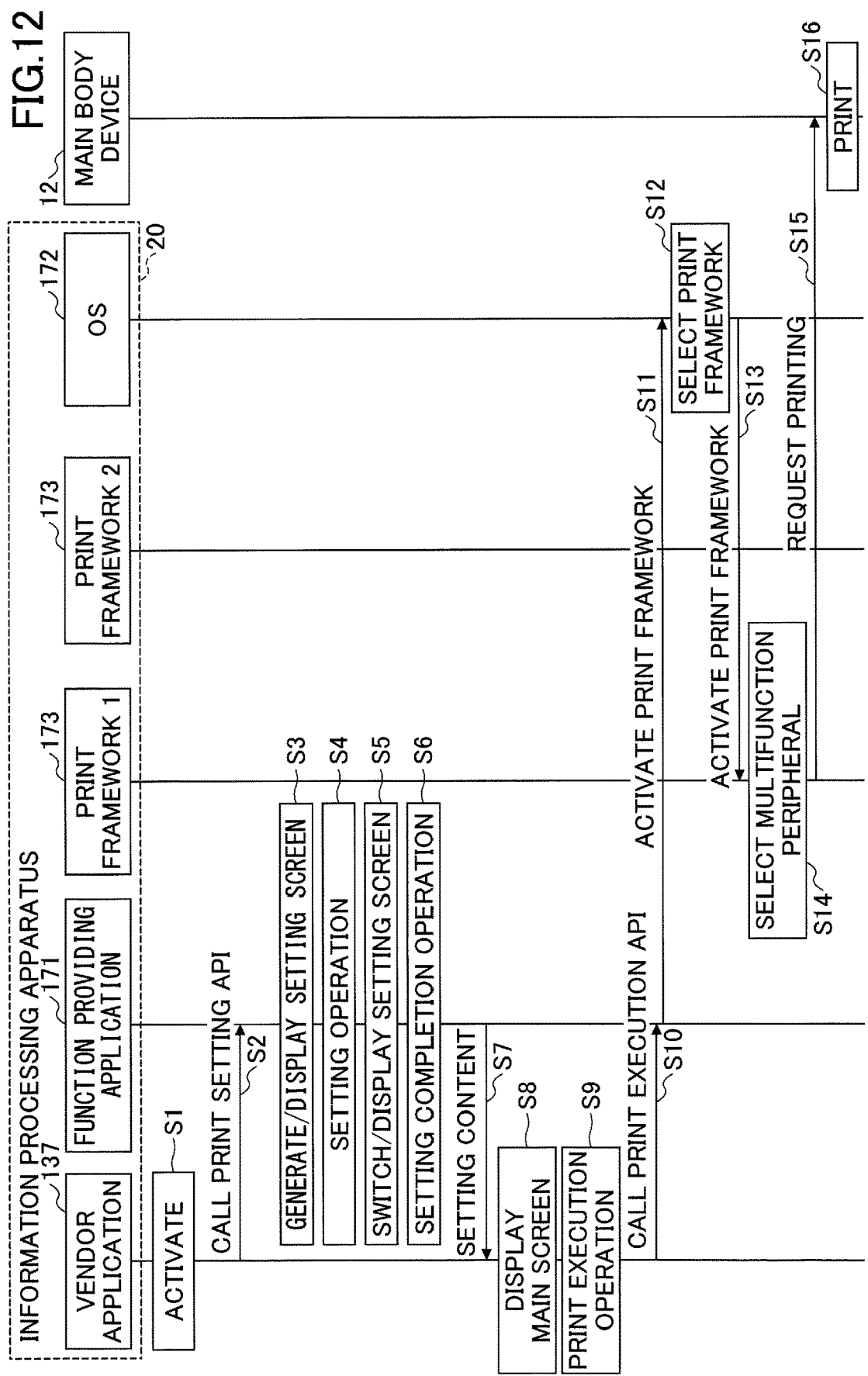
FIG. 12 is a sequence diagram illustrating an example of image processing according to an embodiment of the present invention.

FIG. 12 is a sequence diagram illustrating an example of image processing according to the present embodiment. FIG. 12 is a case where there is a plurality of print frameworks in the <first processing example>. Hereinafter, points that differ from the <first processing example> will be described.

Steps S1 to S10 are the same as the <first processing example>.

In step S11, the transmitting unit 164 of the function providing application 171 instructs the OS 172 of the information processing apparatus 20 to activate the print framework 173. As described above, the print framework 173 is a program that instructs the execution of printing from the information processing apparatus 20, such as Google Cloud Print, Air Print, Mopria, or the like.

In step S12, OS 172 generates a screen for selecting a print framework. The OS 172 displays the generated screen on the display device of the information processing apparatus 20. FIG. 13 is a diagram illustrating an example of a screen for selecting a print framework. When the user selects the print framework to be actually used in such a screen and presses the select button, the selected print framework is activated.

That is, when the information processing apparatus 20 includes one or more print frameworks 173, and the vendor application 137 of the information processing apparatus 20 gives an instruction to execute image processing via the function providing application 171, the information processing apparatus 20 can display the selection screen as illustrated in FIG. 13 for accepting a selection of the print framework 173.

Note that the function providing application 171 may activate one print framework specified in advance among a plurality of print frameworks.

In step S13, the OS 172 activates the selected print framework.

In step S14, the selected print framework 173 generates a screen for selecting the image forming apparatus 10, such as a multifunction peripheral. The selected print framework 173 displays the generated screen on the display device of the information processing apparatus 20.

That is, when one print framework is selected in the selection screen for accepting the selection of the print framework 173 as illustrated in FIG. 13, the selected print framework can display a selection screen for accepting a selection of the image forming apparatus 10 to be the target of requesting the execution of the image processing.

In step S15, the selected print framework 173 transmits the setting content information and the print execution request to the main body device 12 of the image forming apparatus 10.

In step S16, the main body device 12 controls the printing function of the image processing engine 125 based on the setting content information. Accordingly, a substantial printing operation is executed.

Third Processing Example

Figure 14:
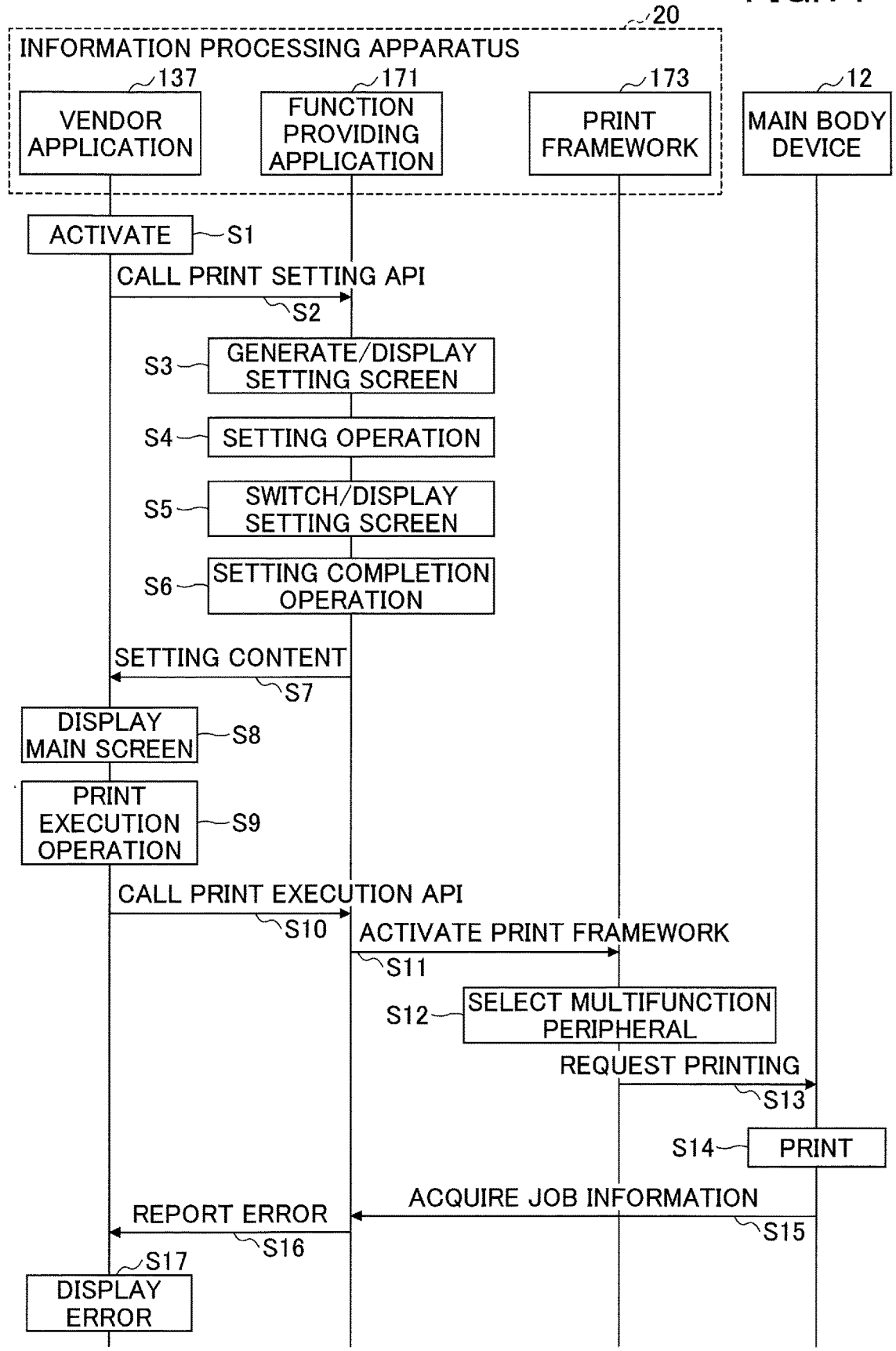
FIG. 14 is a sequence diagram illustrating an example of image processing according to an embodiment of the present invention.

FIG. 14 is a sequence diagram illustrating an example of image processing according to the present embodiment. FIG. 14 is a case in which job information is acquired in the <first processing example>. Hereinafter, points that differ from the <first processing example> will be described. Note that also in the second processing example, job information can be acquired.

Steps S1 to S14 are the same as the <first processing example>.

In step S15, the function providing application 171 acquires information indicating the state of a job of image processing (for example, printing) from the main body device 12. For example, the information indicating the state of a job is acquired by Management Information Base (MIB).

In step S16, when an error is acquired as the information indicating the state of the job, the function providing application 171 reports the error to the vendor application 137.

Figure 15:
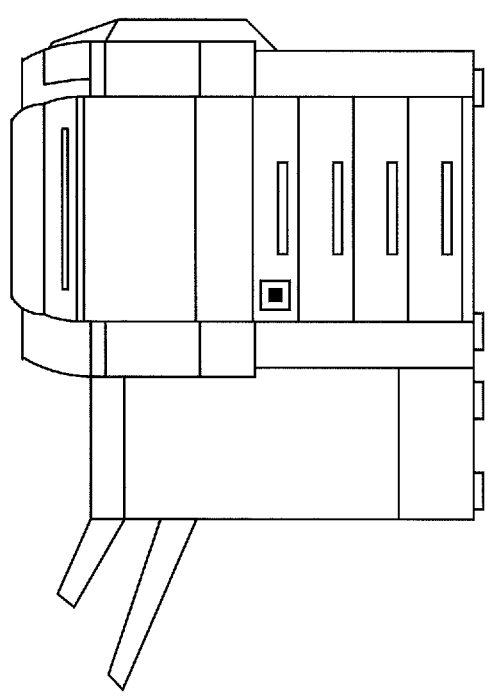
FIG. 15 is a diagram illustrating an example of an error screen according to an embodiment of the present invention.

In step S17, the vendor application 137 displays an error screen as illustrated in FIG. 15 on the display device of the information processing apparatus 20.

The functions of the embodiments described above may be implemented by one or more processing circuits. As used in the present specification, a "processing circuit" includes a processor that is programmed to execute each function by software such as a processor implemented by an electronic circuit, or devices such as an Application Specific Integrated Circuit (ASIC), a Digital Single Processor (DSP), a Field Programmable Gate (FPGA), or a conventional circuit module, etc., designed to execute each function as described above.

According to one embodiment of the present invention, an application for operating an image forming apparatus can be easily developed.

The information processing apparatus, the information processing method, and the image forming system are not limited to the specific embodiments described in the detailed description, and variations and modifications may be made without departing from the spirit and scope of the present invention.

What is claimed is:
1. An information processing apparatus comprising:
first processing circuitry;
second processing circuitry;
a first memory storing computer-executable instructions that cause the first processing circuitry to:

accept, by an application, an instruction to cause an image forming apparatus to execute image processing;

give, by a print framework, an instruction to execute the image processing to the image forming apparatus; and cause, by a first function providing application of the information processing apparatus, the print framework to give the instruction to execute the image processing to the image forming apparatus, upon receiving a call from the application; and a second memory storing computer-executable instructions that cause the second processing circuitry to:

give, by a second function providing application of the image forming apparatus, an instruction to execute the image processing to the image forming apparatus, upon receiving a call from the application, wherein each of the first function providing application and the second function providing application has a user interface (UI) layer, a logic layer, and an Application Programing Interface (API) layer, the UI layer is the same between the first function providing application and the second function providing application, and the logic layer and the API layer are different between the first function providing application and the second function providing application.

2. The information processing apparatus according to claim 1, wherein the first function providing application causes one print framework, selected from among a plurality of the print frameworks, to give the instruction to execute the image processing to the image forming apparatus.

3. The information processing apparatus according to claim 1, wherein the first function providing application:

acquires, from the image forming apparatus, information indicating a state of a job of the image processing; and reports, to the application, the acquired information indicating the state of the job of the image processing.

4. The information processing apparatus according to claim 1, wherein the information processing apparatus is a mobile terminal held by a user of the image forming apparatus, and the first function providing application of the information processing apparatus:

accepts, from the user, an instruction via the application at the mobile terminal; and transmits the instruction to execute the image processing to the image forming apparatus by transferring the instruction accepted from the user to the print framework.

5. The information processing apparatus according to claim 1, wherein the information processing apparatus includes one or more of the print frameworks, and the information processing apparatus displays a selection screen configured to accept a selection of the print framework, upon detecting that the application of the information processing apparatus is to give the instruction to execute the image processing via the first function providing application.

6. The information processing apparatus according to claim 5, wherein upon one print framework being selected from among the one or more of the print frameworks in the selection screen configured to accept the selection of the print framework, the selected one print framework displays a selection screen configured to accept a selection of the image forming apparatus to be a target of the instruction to execute the image processing.

7. An information processing method comprising:

accepting, by an application, an instruction to cause an image forming apparatus to execute image processing;

causing, by a first function providing application of the information processing apparatus, a print framework to give an instruction to execute the image processing to the image forming apparatus, upon receiving a call from the application; and giving, by the print framework, the instruction to execute the image processing to the image forming apparatus; and giving, by a second function providing application of the image forming apparatus, an instruction to execute image processing to the image faulting apparatus, upon receiving a call from the application, wherein each of the first function providing application and the second function providing application has a user interface (UI) layer, a logic layer, and an Application Programing Interface (API) layer, the UI layer is the same between the first function providing application and the second function providing application, and the logic layer and the API layer are different between the first function providing application and the second function providing application.

8. An image forming system comprising:

an information processing apparatus; and an image forming apparatus, wherein the information processing apparatus includes:

first processing circuitry;

second processing circuitry, a first memory storing computer-executable instructions that cause the processing circuitry to accept, by an application, an instruction to cause the image forming apparatus to execute image processing;

give, by a print framework, an instruction to execute the image processing to the image forming apparatus; and cause, by a first function providing application of the information processing apparatus, the print framework to give the instruction to execute the image processing to the image forming apparatus, upon receiving a call from the application; and a second memory storing computer-executable instructions that cause the second processing circuitry to:

give, by a second function providing application of the image forming apparatus, an instruction to execute image processing to the image forming apparatus, upon receiving a call from the application, wherein each of the first function providing application and the second function providing application has a user interface (UI) layer, a logic layer, and an Application Programing Interface (API) layer, the UI layer is the same between the first function providing application and the second function providing application, and the logic layer and the API layer are different between the first function providing application and the second function providing application.

* * * * *